April 9, 1935.  E. W. DAVIS ET AL  1,996,793
LUBRICATING APPARATUS
Filed June 26, 1933   2 Sheets-Sheet 1
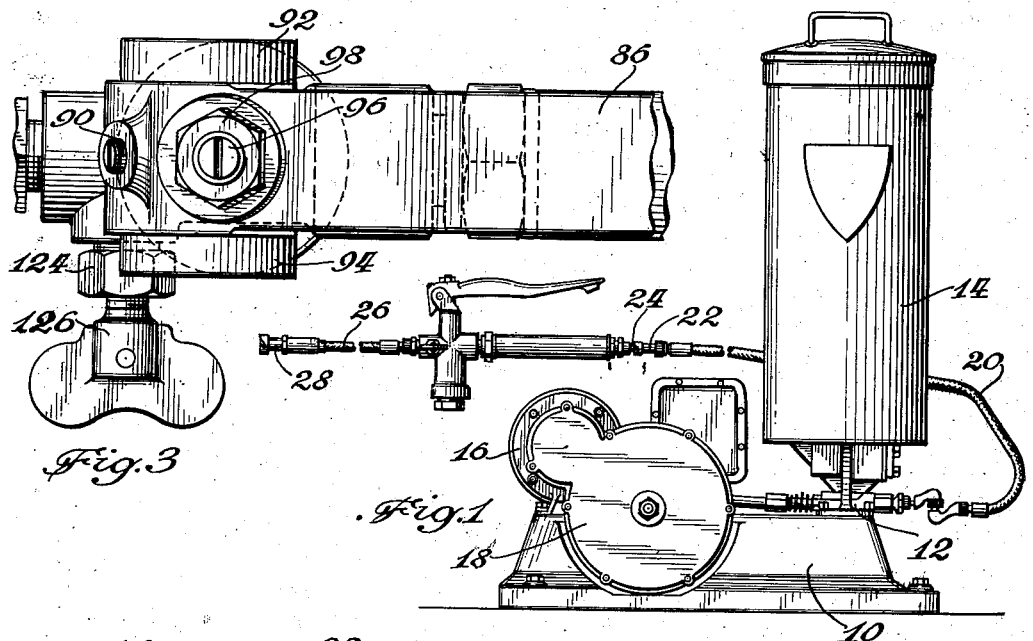
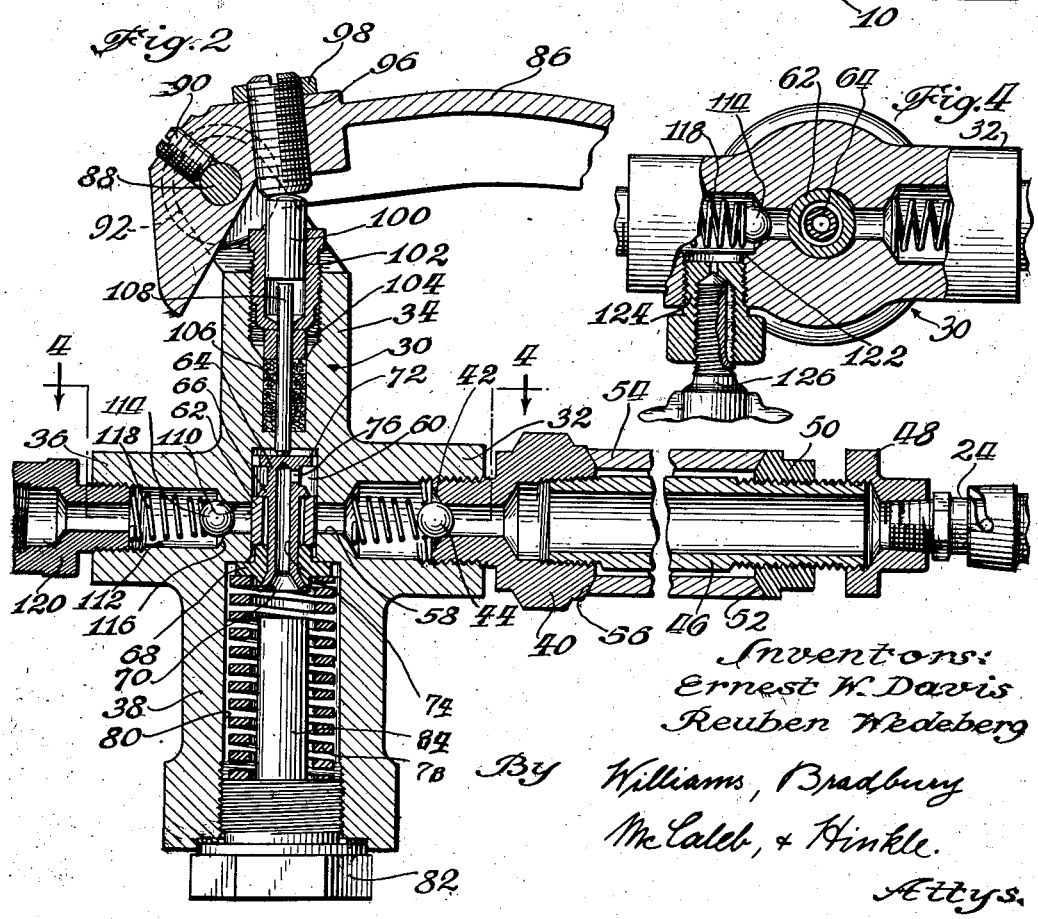

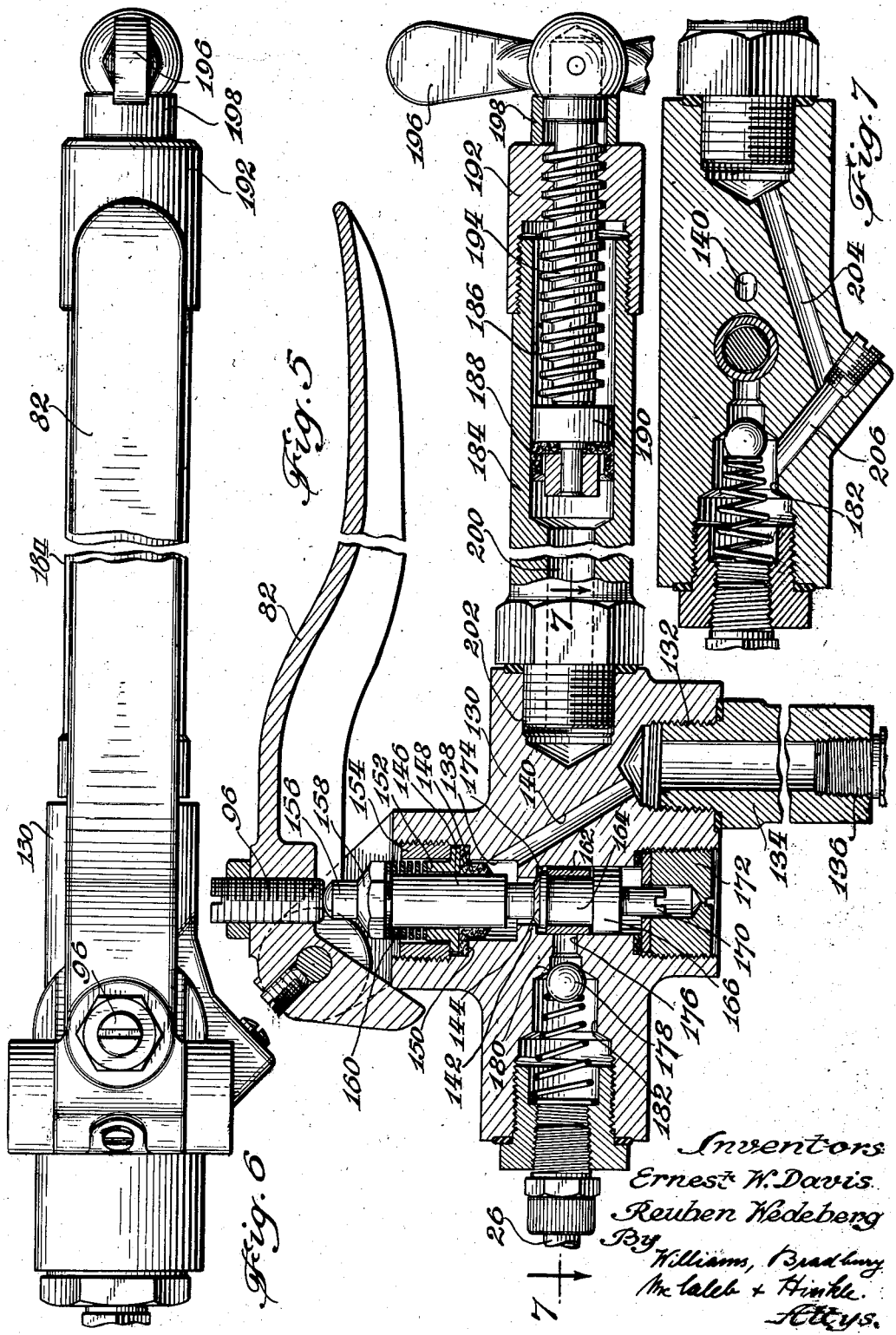

Patented Apr. 9, 1935

1,996,793

UNITED STATES PATENT OFFICE 1,996,793

LUBRICATING APPARATUS

Ernest W. Davis and Reuben Wedeberg, Chicago, Ill., assignors, by mesne assignments, to Stewart-Warner Corporation, Chicago, Ill., a corporation of Virginia Application June 26, 1933, Serial No. 677,624

4 Claims. (Cl. 221—47.3)

Our invention relates generally to lubricating apparatus and more particularly to improved control valves for high pressure lubricant compressors.

It is an object of our invention to provide an improved lubricant control valve for high pressure lubricating apparatus which is simple in construction, which may be easily operated, and which will be very durable.

Other objects will appear from the following description, reference being had to the accompanying drawings, in which:

Figure 1 is an elevation of a high pressure lubricant compressor and its discharge conduit, in which our improved valve is incorporated;

Figure 2 is a longitudinal sectional view of the control valve;

Figure 3 is a plan view thereof;

Figure 4 is a fragmentary sectional view taken on the line 4—4 of Fig. 2;

Figure 5 is a longitudinal sectional view of a modified form of the control valve;

Figure 6 is a plan view of the modification shown in Fig. 5; and

Figure 7 is a fragmentary sectional view taken on the line 7—7 of Fig. 5.

The control valve of our invention is adapted to be used in conjunction with a high pressure lubricant compressor which may be of any suitable construction, the compressor illustrated in Fig. 1 being merely exemplary and comprising a base 10 upon which is mounted a high pressure lubricant pump 12 and a lubricant container 14. The pump is operated by a motor 16 driving through gears contained within a housing 18. The outlet of the pump has a discharge conduit 20 connected thereto, the conduit terminating in a coupler 22 which is adapted to be connected to a pin fitting 24 forming part of the control valve. A whip end conduit 26 in effect forms an extension of the conduit 20 and terminates in a coupler 28 adapted to be connected successively to a plurality of pin fittings attached to the bearings to be lubricated. The couplers 22 and 28 and the pin fitting 24 may be of conventional construction, such for example, as illustrated in the patent to A. V. Gullborg, No. 1,307,774. The lubricant compressor is adapted to operate intermittently as required to maintain a predeterminel lubricant pressure within the conduit 20.

The control valve comprises a body 30 having four boss-like projections 32, 34, 36, and 38. A bushing 40 is threaded in the boss 32, the end of the bushing being beveled to form a valve seat 42 for a spring pressed ball check valve 44. A pipe 46 is threaded in the bushing 42 and at its outer end carries a bushing 48 in which the pin fitting 24 is threaded. A collar 50 threaded on the pipe 46 adjacent the bushing 48 has a beveled face 52 which is adapted to engage a complementally beveled end surface of a tubular handle 54, the other end of the handle being similarly beveled and adapted to engage the beveled surface 56 on the bushing 40. The lubricant supplied by the conduit 20 may thus flow through the pin fitting 24, pipe 46, past the check valve 44 into a port 58 forming the inlet for a cylindrical valve chamber 60.

A hollow cylindrical valve 62 is longitudinally slidable in the valve chamber 60. The valve 62 is mounted on a valve carrier 64, being held between an annular flange 66 projecting from the latter and a washer 68, the latter being held in place by the flare end portion 70 of the valve carrier. The latter has a notched head 72 which slidingly engages the cylindrical walls of the valve chamber 60, the carrier having an axially drilled hole 74 which is in communication with the valve chamber 60 through a port 76.

A compression coil spring 78 is mounted within the cylindrical bore 80 of the boss 38 and has one end abutting against the lower face of the washer 68 and the other end resting upon a plug 82 threaded in the end of the boss 38, the plug having a cylindrical extension 84 projecting within the coil spring 78 to prevent the latter from buckling.

A handle 86 is secured to a pivot pin 88 by a set screw 90, the pin 88 being pivoted at its end in a pair of lugs 92, 94 formed integrally with the valve body 30 at the end of the boss 34. An adjustable set screw 96 is threaded in the handle 86 and is adapted to be locked in set position by a nut 98. The end of the set screw is adapted to contact with the rounded end of a plunger 100, which is freely reciprocable in the cylindrical bore of a bushing 102 which is threaded in the end of the boss 34.

The bushing 102 also serves as a packing nut, its lower end pressing a washer 104 against a plurality of packing washers 106 which prevent leakage around a stem 108. The stem 108 has one end projecting into the bushing 102 and its other end projecting into the valve chamber 60 and contacting with the head 72 of the valve carrier 64. The valve 62 is adapted to close an outlet port 110 which communicates with a bore 112 formed in the boss 36.

A spring pressed ball check valve 114 engages a seat 116 formed at the end of the port 110, the spring 118 of this check valve being seated upon an end connection 120 of the whip end hose 26. The bore 114 has a sidewardly extending opening 122 (Fig. 4) in which is threaded a vent valve seat member 124 which is normally closed by a valve 126.

After the coupler 28 has been connected to a bearing to be lubricated the flow of lubricant to the bearing may easily be controlled by depressing the handle 86 (swinging it clockwise, Figs. 1 and 2), whereupon the adjustable screw 96 will move the plunger 100 downwardly and through the stem 118, depress the valve carrier 64 and valve 62 downwardly against the force of the spring 78.

As soon as the valve uncovers the port 110, lubricant will flow from the conduit 20 through the pipe 46 past the check valve 44 into the valve chamber 60. It will be noted that the external diameter of the valve 62 is slightly less than the diameter of the valve chamber 60, so that the lubricant within the chamber 60 as well as in the bore 80 will normally be under pressure.

The lubricant pressure within the chamber 60 will normally hold the valve 62 pressed tightly against the surface of the valve chamber 60 adjacent the outlet 110. The rate of flow of lubricant through the control valve may be regulated with extreme nicety, due to the fact that the valve 62 as it is depressed uncovers portions of the outlet port 110 of progressively increasing cross sectional area per unit of distance the valve is depressed. Since the stem 108 is of relatively small diameter the pressure of the lubricant on the lower end thereof will have but little effect, and the force-resisting opening of the valve will be contributed substantially wholly by the spring 78. The valve may thus be opened to any desired extent and held in such open position with ease.

In this manner the valve of our construction distinguishes from most of the valves at present used, since in the latter the valve is operated against the lubricant pressure, which, being variable, makes it difficult for the operator partially to open the valve to a predetermined position.

The control valve shown in Figs. 5, 6, and 7 is generally similar to that above described, and we have therefore applied similar reference characters to parts thereof which correspond closely to those previously described.

The valve comprises a body 130 which has an opening 132 into which a bushing 134 is threaded, the bushing having a pin fitting 136 secured thereto for connection with the discharge conduit 20 of the lubricant compressor. The opening 132 communicates with an axial bore 138 formed in the valve body 130 through a drilled passageway 140. An inwardly extending shoulder 142 directly beneath the bore 138 forms a seat for a poppet valve 144. The valve 144 is formed integrally with a plunger 146. A flanged leather 148 has its cylindrical portion engaging the plunger 146 and its flange portion clamped against a shoulder 150 by a gland 152, the latter being pressed against the flanged leather by a sleeve 154 threaded in the body 130.

A cap 156 is threaded in the end of the plunger 148 and has a flange 158 against which one end of a compression spring 160 abuts, the lower end of the spring resting upon the gland 152. A short tubular valve 162 is secured about the lower cylindrical portion 164 of the plunger 148, being held against appreciable movement on this cylindrical portion by a flanged end piece 166 threaded to the cylindrical portion 164. The end piece 166 has a kerfed small diameter extension 170 which is guided in an axial bore formed in a plug 172 threaded in the body 130. The valve 162 is slidable and rotatable in a cylindrical valve chamber 174 and normally closes an outlet port 176.

A spring pressed ball check valve 178 engaging a seat 180 prevents return flow from the whip end discharge conduit 26 to the outlet port 176, the valve being located in a bore 182.

A pressure booster is provided to raise the lubricant pressure in the whip end discharge conduit 26 whenever the pressure of the lubricant supplied by the compressor is insufficient to force the lubricant into the bearing. This booster comprises a cylinder 184 threaded in the valve body 130 and having a cylindrical bore 186. A cup leather piston 188 is freely reciprocable in said bore, the cup leather thereof being secured to a backing and guide member 190. The end of the cylinder bore 186 is closed by a cap 192 which is internally threaded to receive a threaded stem 194, to the outer end of which is secured a handle 196. The stem 194 has a separator sleeve 198 secured thereto adjacent the handle 196 to limit the inward movement of the stem. The booster cylinder 184 has a passageway 200 which communicates with a drilled bore 202 formed in the valve body 130, and is in communication with the bore 182 through a pair of interconnected passageways 204, 206 (Fig. 7).

The pin fitting 136 having been connected to the discharge 20 of a high pressure lubricant compressor, and the coupler 28 having been connected to a fitting attached to a part to be lubricated, lubricant may be supplied to the bearing by depressing the handle 86 (swinging it clockwise, Fig. 5), whereupon the adjustable set screw 96 will engage the rounded end of the cap 156 and depress the plunger 146, first opening the poppet valve 144 and thereafter sliding the hollow cylindrical valve 160 downwardly sufficient to uncover the outlet port 176. Thereupon lubricant will flow past the valves 144, 162, and check valve 178 to the bearing, the rate of flow being accurately controlled by the extent of depression of the handle 82.

If the bearing is of such high resistance that the lubricant does not readily flow into it under the pressure developed by the lubricant compressor, the pressure in the whip end hose 26 may be raised by means of the booster. The handle 196 of the booster piston is unscrewed and the valves 142, 162 then opened, whereupon the lubricant pressure will force the piston 188, 190 to the right (Fig. 5) in the cylinder 186 until the member 190 of the piston abuts against the stem 194.

Thereafter, by screwing the stem 194 inwardly an extremely high pressure may be developed within the cylindrical bore 186 which is, of course, in communication with the whip end discharge conduit 26, so that this excess pressure will be exerted upon the bearing to clear the obstruction which has prevented the flow of lubricant to the bearing.

While we have shown and described particular embodiments of our invention it will be readily understood by those skilled in the art that variations may be made in the constructions disclosed without departing from the basic features of our invention. We therefore do not wish to be limited to the precise constructions disclosed but wish to include within the scope of our invention all such modifications and variations which will readily suggest themselves.

What we claim as new and desire to secure by United States Letters Patent, is:

1. In a control valve for high pressure lubricating apparatus, the combination of a valve body having a cylindrical valve chamber formed therein, said valve chamber having an inlet port at one end thereof and an outlet port in the cylindrical wall thereof, a plunger extending through said inlet port and projecting from the valve body, sealing means around said plunger, a poppet valve carried by said plunger and cooperable with the edge of said body around said inlet port to close said port, a hollow cylindrical shell mounted for rotation and limited axial movement relative to said plunger, said hollow cylindrical valve being positioned to close said outlet port when said poppet valve is closed and to uncover said outlet port after said poppet valve has been moved from its seat, and a manually operable lever cooperating with the external end of said plunger to move the latter and thereby operate said valves.

2. A control valve for high pressure lubricating apparatus, comprising a body having a cylindrical valve chamber and provided with inlet and outlet passageways communicating with said chamber, a hollow cylindrical valve reciprocable within said chamber and adapted to close said outlet passageway, a carrier for said valve, a spring cooperable with said carrier to hold said valve over said outlet passageway, a plunger of small diameter projecting into said chamber from the exterior of said body, and a manually operable lever pivotally connected with said body and having a part engageable with the external end of said plunger thereby to project said plunger into said chamber and to cause it to engage said carrier and thus to move said valve relative to said outlet passageway against the force of said spring.

3. A flow control valve for high pressure lubricating apparatus comprising a body having a bore extending therethrough, said body having a valve seat intermediate its ends, a valve engageable with said seat, a stem for said valve, a spring operative resiliently to hold said valve upon its seat, an outlet port beyond said seat, and a slide valve connected to said first valve and operable to control the flow of lubricant through said outlet port.

4. In a control valve for high pressure lubricating apparatus, the combination of a body having a bore extending therethrough, a plug closing one end of said bore, a plunger reciprocable in said bore, and projecting from the end thereof opposite said plug, means to prevent escape of lubricant from said bore around said plunger, said bore having a part forming a valve chamber with an outlet port, an outwardly opening check valve normally closing said outlet port a hollow cylindrical valve substantially the diameter of said valve chamber and reciprocable therein, and manually operable means for increasing the lubricant pressure on the discharge side of said outlet check valve.

ERNEST W. DAVIS.
REUBEN WEDEBERG.